(12) United States Patent
Lee et al.

(10) Patent No.: US 10,877,311 B2
(45) Date of Patent: Dec. 29, 2020

(54) HELICAL PHOTONIC CRYSTAL-BASED REFLECTIVE-TYPE COLOR DISPLAY AND METHOD FOR MANUFACTURING THE SAME

(71) Applicant: SEOUL NATIONAL UNIVERSITY R&DB FOUNDATION, Seoul (KR)

(72) Inventors: Sin-Doo Lee, Seoul (KR); Se-Um Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 220 days.

(21) Appl. No.: 15/980,488

(22) Filed: May 15, 2018

(65) Prior Publication Data

US 2018/0373093 A1     Dec. 27, 2018

(30) Foreign Application Priority Data

Jun. 27, 2017   (KR) ........................ 10-2017-0081201

(51) Int. Cl.
| | |
|---|---|
| *G02F 1/1335* | (2006.01) |
| *G02F 1/139* | (2006.01) |
| *G02B 1/00* | (2006.01) |
| G02F 1/137 | (2006.01) |
| G02F 1/1337 | (2006.01) |

(Continued)

(52) U.S. Cl.
CPC ....... *G02F 1/133553* (2013.01); *G02B 1/005* (2013.01); *G02F 1/1393* (2013.01);
(Continued)

(58) Field of Classification Search
CPC ................ G02B 1/005; G02F 2202/32; G02F 1/133553; G02F 1/133533;
(Continued)

(56) References Cited

U.S. PATENT DOCUMENTS

| | | | |
|---|---|---|---|
| 7,330,226 B2 * | 2/2008 | Kim ................. | G02F 1/133514 349/106 |
| 8,363,185 B2 * | 1/2013 | Cho ....................... | G02B 1/005 349/105 |

(Continued)

FOREIGN PATENT DOCUMENTS

| | | |
|---|---|---|
| JP | 2000-329953 A | 11/2000 |
| KR | 10-2010-0040650 A | 4/2010 |

(Continued)

OTHER PUBLICATIONS

European Patent Office, Extended Search Report and Opinion, European Patent Application No. 18173492.2, dated Oct. 11, 2018, fourteen pages.

(Continued)

*Primary Examiner* — Paisley L Wilson
(74) *Attorney, Agent, or Firm* — Fenwick & West LLP

(57) ABSTRACT

A reflective-type color display according to the present disclosure includes a lower substrate and an upper substrate, a polarization plate positioned on an outer surface of the upper substrate, a plurality of helical photonic crystals arranged between the lower substrate and the upper substrate and having different reflection properties of light in the visible region, and a tunable wave plate positioned on the plurality of helical photonic crystals to control the reflection intensity by continuously changing the phase retardation. According to an embodiment, it is possible to simultaneously achieve the features of three primary colors, analog grey levels, high resolution, and fast response through the separation of the function of color reflection from the intensity tuning capability of the photonic crystal, beyond the limitation of existing reflective-type display technology.

18 Claims, 15 Drawing Sheets

(51) Int. Cl.
*G02F 1/1343* (2006.01)
*G02F 1/13363* (2006.01)

(52) U.S. Cl.
CPC ...... *G02F 1/133533* (2013.01); *G02F 1/1343* (2013.01); *G02F 2001/13706* (2013.01); *G02F 2001/133541* (2013.01); *G02F 2001/133543* (2013.01); *G02F 2001/133565* (2013.01); *G02F 2001/133638* (2013.01); *G02F 2001/133738* (2013.01); *G02F 2201/343* (2013.01); *G02F 2202/32* (2013.01); *G02F 2203/50* (2013.01)

(58) Field of Classification Search
CPC ... G02F 2001/133543; G02F 2201/343; G02F 2001/133541; G02F 2001/133638
See application file for complete search history.

(56) References Cited

U.S. PATENT DOCUMENTS

| | | | |
|---|---|---|---|
| 9,152,040 | B1 | 10/2015 | Brueck et al. |
| 2002/0167278 | A1 | 11/2002 | Yoon |
| 2004/0090579 | A1 | 5/2004 | Kim |
| 2010/0079863 | A1* | 4/2010 | Thiel ............... B82Y 20/00 359/487.01 |
| 2010/0091225 | A1 | 4/2010 | Cho et al. |

FOREIGN PATENT DOCUMENTS

| | | |
|---|---|---|
| KR | 10-2011-0089214 A | 8/2011 |
| KR | 10-2013-0029376 A | 3/2013 |

OTHER PUBLICATIONS

Kim, S-U. et al., "Generation of intensity-tunable structural color from helical photonic crystals for full color reflective-type display," *Optics Express 13561*, May 10, 2018, vol. 26, No. 10, May 14, 2018, twelve pages.

Li, Y. et al., "Full-color reflective display based on narrow bandwidth templated cholesteric liquid crystal film," *Optical Materials Express 16*, Dec. 2, 2016, vol. 7, No. 1, Jan. 1, 2017, nine pages.

European Patent Office, Communication pursuant to Article 94(3) EPC, EP Patent Application No. 18173492.2, dated Feb. 26, 2020, five pages.

* cited by examiner

HELICAL PHOTONIC CRYSTAL-BASED REFLECTIVE-TYPE COLOR DISPLAY AND METHOD FOR MANUFACTURING THE SAME

CROSS-REFERENCE TO RELATED APPLICATION

This application claims priority to Republic of Korea Patent Application No. 10-2017-0081201, filed on Jun. 27, 2017, and all the benefits accruing therefrom under 35 U.S.C. § 119, the contents of which are incorporated by reference in its entirety.

BACKGROUND

1. Field

The present disclosure relates to a helical photonic crystal-based reflective-type color display and a method for manufacturing the same, and particularly, to a reflective-type color display in which the intensity of structural color reflected from a plurality of helical photonic crystals is controlled using the helical photonic crystals having different light reflection properties in the visible light region and a tunable wave plate for tuning the reflectance intensity by continuously changing the phase retardation, and a method for manufacturing the same.

2. Description of the Related Art

The key concept of reflective-type display technology is that static or dynamic images are formed by the amount of the reflectance of ambient light incident on a reflective-type display. Color representation in reflective-type displays is accomplished using a transmission-type color filter, or by selectively reflecting light of red (R), green (G) and blue (B) known as three primary colors of light from incident light.

However, current commercial reflective-type display technologies such as electronic paper suffer from color presentation and analog grey capability. Although an interferometric modulator is capable of representing multi-colors and moderate grey levels, it still limits the resolution and the grey levels due to the correlation between them by the use of a spatial division method. Moreover, its dynamic response is low.

To overcome those limitations of the existing reflective-type displays, several attempts to exploit the structural coloration based on photonic crystals have been made so far. The structural colors of photonic crystals have such advantages that the intensity of the light modulation is high, structural colors are uniform, and the light modulation can be controlled by means of various external stimuli including electrical, thermal, optical and mechanical stimuli. However, the fabrication process of a photonic crystal and the patterning process for different colors require a few tens to a few hundreds of nanometers in unit to reflect the light in the visible light region, necessarily involving the difficulty in producing large scale arrays and the high cost in manufacturing.

Furthermore, because the achievement of the tuning capability in photonic crystals needs material substitution or structure modification in solid state, it is barely possible to simultaneously obtain a wide tuning range, fast response, durability, and low energy consumption.

Recently, toward solving this problem, tunable photonic crystal-based reflective-type displays using a liquid crystal structure such as chiral liquid crystals were explored. The chiral liquid crystals are considered as a class of helical photonic crystals in a form of the molecular alignment to reflect light with a particular polarization component at a certain wavelength. Because the reflection at the specific wavelength in a chiral liquid crystal-based tunable photonic crystal is determined by the optical birefringence and the helical pitch of the liquid crystal, it is possible to obtain the selective reflection at the specific wavelength in the visible light region through the adjustment of the birefringence and the helical pitch.

However, in the case of tunable photonic crystals using chiral liquid crystals, due to the nature of the fluidity of the liquid crystal, the helical structure is inevitably distorted or the helical pitch is changed by external heat, pressure, and voltage, reducing the color uniformity and the reflectivity. These characteristics inherent to the fluidity limit reflective-type color display applications. For the use of structural coloration of photonic crystals in advanced reflective-type color display applications, a new concept of the photonic crystal-based technology needs to be developed for achieving high optical efficiency, high uniformity of colors beyond the existing technologies.

SUMMARY

Embodiments of the present disclosure are directed to providing a new concept reflective-type color display in which elements of chiral photonic crystals producing structural colors and reflection whose intensity is tunable through the phase retardation are independently added while minimizing the changes in shape or materials of the photonic crystals, and a method for manufacturing the same.

Embodiments of the present disclosure are further directed to providing a reflective-type color display with outstanding reliability and stability through the separation of the function of color reflection from the intensity tuning capability of the photonic crystal to achieve high color uniformity and high reflectance, and a method for manufacturing the same.

A reflective-type color display according to an embodiment includes a lower substrate and an upper substrate, a polarization plate positioned on the outer surface of the upper substrate, a plurality of helical photonic crystals arranged on the inner surface of the lower substrate and having different reflection properties for visible light, and a tunable wave plate positioned on the plurality of helical photonic crystals to control the reflection intensity through the continuous change of the phase retardation.

In the reflective-type color display according to an embodiment, at least two of the plurality of helical photonic crystals may have different values of the thickness or the helical pitch.

In the reflective-type color display according to an embodiment, the helical photonic crystal may be configured to reflect the incident light in the wavelength range corresponding to the helical pitch and with the polarization component in the same sense of the handedness as the helical photonic crystal.

In the reflective-type color display according to an embodiment, the helical photonic crystal may have a cross section of a closed figure shape formed by a polygon or a curve and a straight line when viewed along a direction perpendicular to a surface of the lower substrate.

The reflective-type color display according to an embodiment may further include a light-blocking region where the helical photonic crystal is not arranged.

In the reflective-type color display according to an embodiment, the molecular arrangement in the helical photonic crystals may be set to form a helical shape around an axis that is in a direction perpendicular to the lower substrate.

The reflective-type color display according to an embodiment may further include an electrode layer patterned on each of facing surfaces of the lower substrate and the upper substrate, wherein the electrode layer may be used for electrically controlling the phase retardation of a tunable wave plate.

The reflective-type color display according to an embodiment may further include an alignment layer formed on each electrode layer, wherein the alignment layer may define the initial molecular alignment direction of the helical photonic crystals.

The reflective-type color display according to an embodiment may be a reflective-type liquid crystal display including a tunable wave plate composed of a liquid crystal.

A method for manufacturing a reflective-type color display according to an embodiment includes patterning of an electrode layer on each of facing surfaces of a lower substrate and an upper substrate, forming an alignment layer on each electrode layer, arranging a plurality of helical photonic crystals on the alignment layer of the lower substrate, forming a tunable wave plate on the plurality of helical photonic crystals, placing the alignment layer of the upper substrate on the tunable wave plate, and placing a polarization plate on the upper substrate.

A method for manufacturing a reflective-type color display according to another embodiment includes patterning of an electrode layer on each of facing surfaces of a lower substrate and an upper substrate, forming an alignment layer on each electrode layer, arranging a plurality of helical photonic crystals on the alignment layer of the lower substrate, assembling upper and lower substrate to face each other with a certain cell gap, forming a tunable wave plate in the cell gap between the upper and lower substrates, on the plurality of helical photonic crystals, and placing a polarization plate on the upper substrate.

In the method for manufacturing a reflective-type color display according to an embodiment, at least two of the plurality of helical photonic crystals may have different values of the thickness or the helical pitch.

In the method for manufacturing a reflective-type color display according to an embodiment, the helical photonic crystal may be configured to reflect the incident light in the wavelength range corresponding to the helical pitch and with the polarization component in the same sense of the handedness as the helical photonic crystal.

In the method for manufacturing a reflective-type color display according to an embodiment, the helical photonic crystal may have a cross section of a closed figure shape formed by a polygon or a curve and a straight line when viewed along a direction perpendicular to a surface of the lower substrate.

In the method for manufacturing a reflective-type color display according to an embodiment, the molecular arrangement in the helical photonic crystals may be set to form a helical shape around an axis that is in a direction perpendicular to the lower substrate.

In the method for manufacturing a reflective-type color display according to an embodiment, the electrode layer may be used for electrically controlling the phase retardation of a tunable wave plate.

In the method for manufacturing a reflective-type color display according to an embodiment, the alignment layer may define the initial molecular alignment direction of the helical photonic crystals.

According to the embodiments of the present disclosure, there is provided a reflective-type color display including helical photonic crystals capable of reflecting the incident light at specific wavelengths in the visible range and with the polarization component in the same sense of the handedness as the photonic crystal, and a tunable wave plate positioned on the helical photonic crystals to control the intensity of the reflected light.

According to the embodiments, it is possible to simultaneously achieve the features of three primary colors, analog grey levels, high resolution, and fast response through the separation of the function of color reflection from the intensity tuning capability of the photonic crystal beyond the limitation of existing reflective-type display technology.

In addition, in contrast to traditional technology, the proposed technology allows for analog grey levels of red (R), green (G), and blue (B) using a temporal division method and achieves high-resolution dynamic color images.

DETAILED DESCRIPTION

Figure 1:
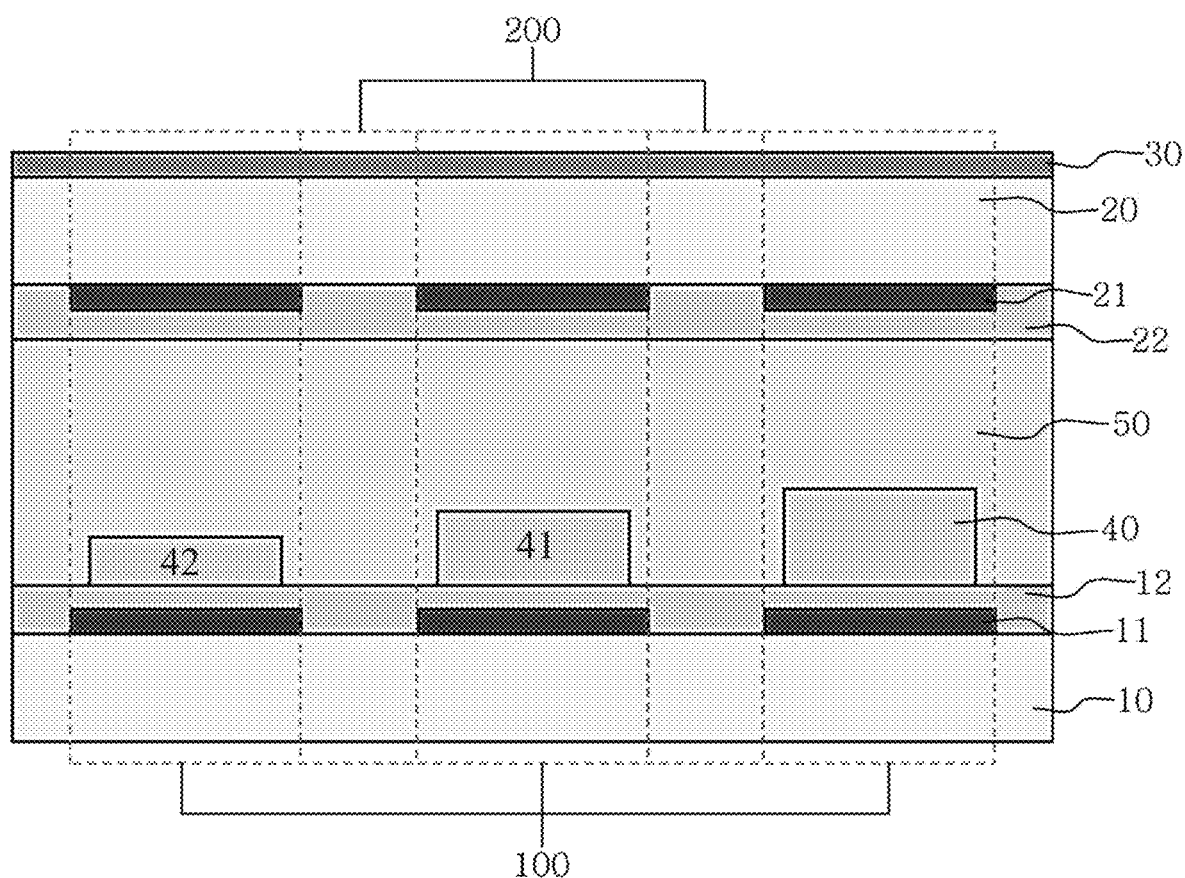
FIG. 1 is a cross-sectional view of a reflective-type color display according to an embodiment.

The present disclosure is described in detail as below with reference to the accompanying drawings in which particular embodiments for carrying out the present disclosure are shown for illustration. These embodiments are described in sufficient detail to enable those skilled in the art to practice the present disclosure. It should be understood that various embodiments of the present disclosure are different from each other, but they do not need to be exclusive. For example, a particular shape, structure and characteristic described herein, in connection with one embodiment, may be implemented in other embodiments without departing from the spirit and scope of the present disclosure.

Further, it should be understood that modification may be made to the position or arrangement of respective elements in each disclosed embodiment without departing from the spirit and scope of the present disclosure. Therefore, the following detailed description is not made in a restrictive sense, and the scope of the present disclosure is only defined by the appended claims, if appropriately described, along with the full scope of equivalents to which the claims are entitled. In the drawings, similar reference numerals denote same or similar functions throughout many aspects.

Hereinafter, the embodiments of the present disclosure will be described in more detail with reference to the accompanying drawings.

FIG. 1 is a cross-sectional view of a reflective-type color display according to an embodiment.

Referring to FIG. 1, the reflective-type color display according to an embodiment of the present disclosure includes a lower substrate 10 and an upper substrate 20, a polarization plate 30 positioned on the outer surface of the upper substrate, a plurality of helical photonic crystals 40, 41, and 42 arranged on the lower substrate, and a tunable wave plate 50 positioned on the plurality of helical photonic crystals.

According to an embodiment, the reflective-type color display may further include electrode layers 11, 21 patterned on each of facing surfaces of the lower substrate 10 and the upper substrate 20 (i.e., inner surfaces of the two substrates), and may further include alignment layers 12, 22 formed on the electrode layers 11, 21 respectively.

In the specification, each unit pixel 100 that is a basic building block of the display includes the lower substrate 10, the upper substrate 20, the polarization plate 30, the electrode layers 11, 21, the alignment layers 12, 22, the helical photonic crystal (one of 40, 41 and 42) and the tunable wave plate 50, and in the display, a region in which helical photonic crystals 40 to 42 are not formed is defined as a light-blocking region.

Hereinafter, the function of each element in the unit pixel 100 will be described in detail.

The lower substrate 10 and the upper substrate 20 are parts that support the entire structure of the reflective-type color display, and may be made of glass, quartz, polymer resin (for example, plastics, etc.), or any other appropriate material.

The plurality of helical photonic crystals 40, 41, and 42 arranged between the lower substrate 10 and the upper substrate 20 has different light reflection properties in the visible light range. For example, the plurality of helical photonic crystals may each reflect circular polarization component with the same sense of the handedness in the red (R), green (G) and blue (B) wavelengths.

To have different light reflection properties, the plurality of helical photonic crystals 40, 41, and 42 may be each formed with different values of the thickness or helical pitch. In an embodiment, the helical photonic crystals may have one helical pitch or one or more helical pitches to exhibit the light reflection properties in the visible light range.

Each helical photonic crystal may be made of one or two or more types of dielectric materials, and for example, may be made of chiral reactive mesogen. However, this is for illustration only, and the helical photonic crystals may be made of any material that reflects light with a specific polarization component in a single wavelength range by forming a helical shape along an axis that is in a direction perpendicular to the substrate through the molecular alignment of the photonic crystals, and are not limited to a particular material.

The plurality of helical photonic crystals 40, 41, and 42 may allow the transmission of at least a part of the incident light. For example, the plurality of helical photonic crystals 40, 41, and 42 may allow the transmission of other light except for a circular polarization component with the same sense of the handedness as the helical photonic crystal.

The plurality of helical photonic crystals 40, 41, and 42 are periodically arranged on the lower substrate 10 (to be more specific, on the lower alignment layer 12), and may be separated by the light-blocking region 200 interposed between two adjacent photonic crystals. Light incident on the light-blocking region 200 is transmitted but not reflected, which corresponds to a black matrix in the reflective-type color display.

In an embodiment, the plurality of helical photonic crystals 40, 41, and 42 may have a cross section of a closed figure shape formed by a polygon, a closed curve, or a curve and a straight line when viewed along a direction perpendicular to the surface of the substrate.

The tunable wave plate 50 is formed on the plurality of helical photonic crystals 40, 41, and 42 to continuously change the phase retardation by means of an external voltage. In an embodiment, the display may be a reflective-type liquid crystal display in which the tunable wave plate 50 is made of a liquid crystal. In this instance, when the voltage is applied to the electrode layers 11, 21, the liquid crystal director in the tunable wave plate 50 is re-aligned in a direction parallel to the electric field, changing the amount of the phase retardation. That is, the phase retardation of the tunable wave plate 50 may be controlled by the applied voltage. However, this is for illustration only, and the material and the tuning mechanism of the tunable wave plate are not limited to the foregoing statements.

The polarization plate 30 may be formed on the outer surface of the upper substrate 20 (i.e., the side of the incidence of light). The polarization direction of the polarization plate 30 may have an arbitrary angle with respect to the optical axis of the tunable wave plate 50. For example, the polarization direction of the polarization plate 30 may be at 45° with respect to the optical axis of the tunable wave plate 50.

Referring to FIG. 1, the display may further include the electrode layers 11, 21 patterned on each of facing surfaces of the lower substrate 10 and the upper substrate 20. The electrode layers 11, 21 are used for controlling the phase retardation of the tunable wave plate 50. The patterned electrode layer 11 is on the inner surface of the lower substrate 10, and the patterned electrode layer 21 is on the inner surface of the upper substrate 20, and may be formed with a transparent conductor such as indium-tin-oxide on a glass or plastic substrate by vacuum deposition through a shadow mask. However, this is for illustration only, and the material that forms the substrates 10, 20 and the electrode layers 11, 21 and the forming process is not limited to the foregoing statements.

Further, the reflective-type color display according to an embodiment may further include the alignment layers 12, 22 formed on the electrode layers 11, 21. The alignment layers 12, 22 are used for defining the initial molecular alignment direction of the helical photonic crystals 40 to 42. The alignment layer 12 is formed on the electrode layer 11 of the lower substrate, and the alignment layer 22 is formed on the electrode layer 21 of the upper substrate.

The alignment layers 12, 22 may define the initial molecular alignment direction of the helical photonic crystals 40 to 42 by photo alignment, rubbing, or any other appropriate method. In an embodiment, the alignment layer may be made of a material that can define the molecular alignment direction through an appropriate process, for example, polyimide and silicon oxide ($SiO_2$), but this is for illustration only, and the material that forms the alignment layers 12, 22 and the forming process is not limited to the foregoing statements.

Although the reflective-type color display according to the embodiments described herein is formed such that red (R), green (G) and blue (B) unit pixels composed of the helical photonic crystal, the tunable wave plate, and the polarization plate are periodically arranged, in other embodiments, the type of the helical photonic crystal, the wavelength range for reflection of each helical photonic crystal, the arrangement order and/or the arrangement type may be different from those disclosed herein. For example, the reflective-type color display may be composed of cyan, yellow, and magenta unit pixels, and the structure of the elements may be appropriately changed so that it is suited to an intended field of application.

Hereinafter, a process of manufacturing a reflective-type color display according to an embodiment will be described with reference to FIGS. 2A to 2C.

Figure 2A:
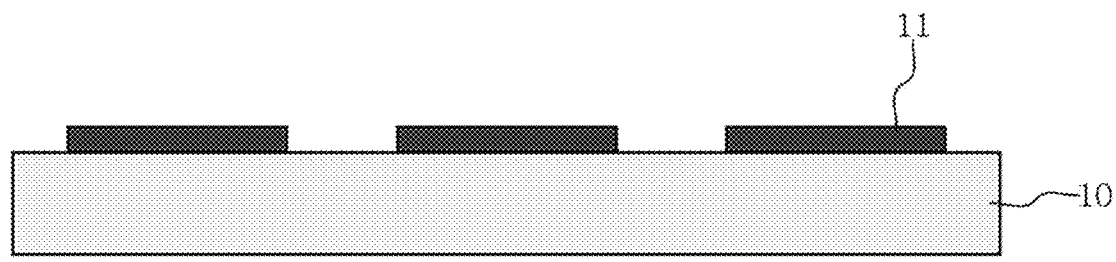
FIGS. 2A to 2C are cross-sectional views showing the sequential processes of manufacturing a reflective-type color display according to an embodiment.
Figure 2A:
Figure 2A:
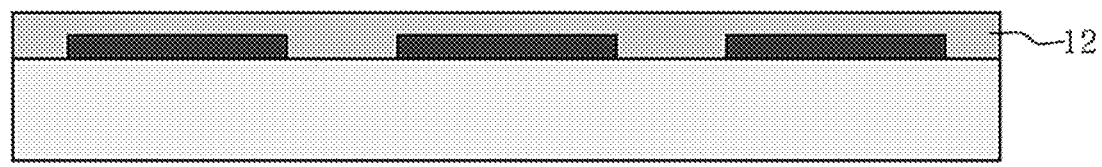

Referring to FIG. 2A, a step for forming the electrode 11 on the inner surface of the lower substrate 10 is performed. For example, the patterned electrode layer 11 may be formed with a transparent conductor such as indium-tin-oxide on a substrate made of glass or plastic using a mask process and vacuum deposition. However, this is for illustration only, and the material that forms the substrate 10 and the electrode layer 11 and the forming process is not limited to the foregoing statements.

Subsequently, a step for forming the alignment layer 12 on the electrode layer 11 is performed. The alignment layer 12 may define the initial molecular alignment direction of helical photonic crystals by photo alignment, rubbing, or any other appropriate method. In an embodiment, the alignment layer 12 may be made of a material that can define the molecular alignment direction through an appropriate process, for example, polyimide and silicon oxide ($SiO_2$).

According to an embodiment, the process of forming the alignment layer 12 may additionally include a process such as rubbing to define the initial molecular alignment direction of the helical photonic crystals 40, 41, and 42. However, this is for illustration only, and the material that forms the alignment layer 12 and the forming process is not limited to the foregoing statement.

Figure 2B:
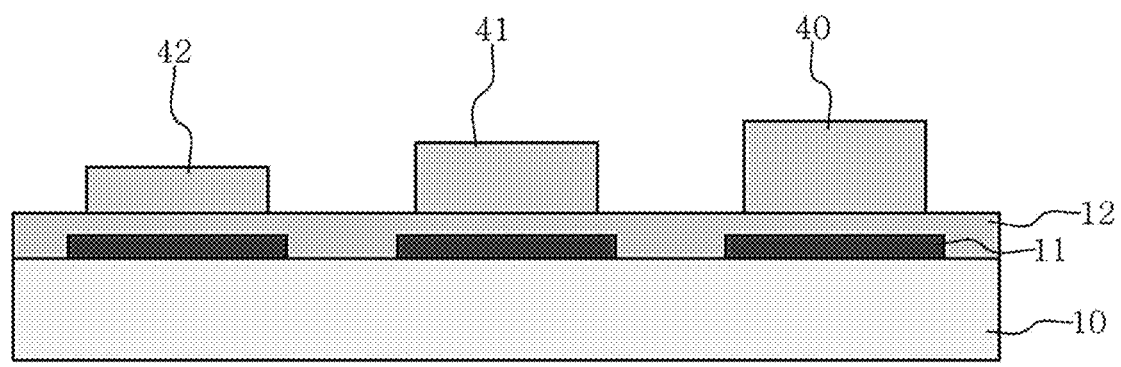

Referring to FIG. 2B, a step for forming the plurality of helical photonic crystals 40, 41, and 42 on the alignment layer 12 is performed. The plurality of helical photonic crystals 40, 41, and 42 are only for selectively reflecting the light in a specific wavelength range. For example, each of the plurality of helical photonic crystals 40, 41, and 42 may reflect the light having circular polarization components with the same sense of the handedness in R, G, B wavelengths. The role and function of the helical photonic crystal are described above, and overlapping descriptions are omitted herein.

In the process, the plurality of helical photonic crystals 40, 41, and 42 may be formed with chiral reactive mesogen on the alignment layer 12 through a solution process, a photo-mask process, and a photo-curing process in series, but are not limited thereto. According to an embodiment, to have different light reflection properties, the helical pitch of the helical photonic crystals 40, 41, and 42 may be varied with adjusting the concentration of chiral reactive mesogen.

In an embodiment, the values of the thickness of the helical photonic crystals 40, 41, and 42 may be larger than the helical pitch so that a fully helical structure is defined. Each helical photonic crystal may be spaced apart to maintain a proper separation between adjacent helical photonic crystals. As described above, this separation corresponds to the light-blocking region (200 in FIG. 1), and the light-blocking region acts like a black matrix in the reflective-type color display, resulting from the transparency of the alignment layer and the substrate.

Figure 2C:
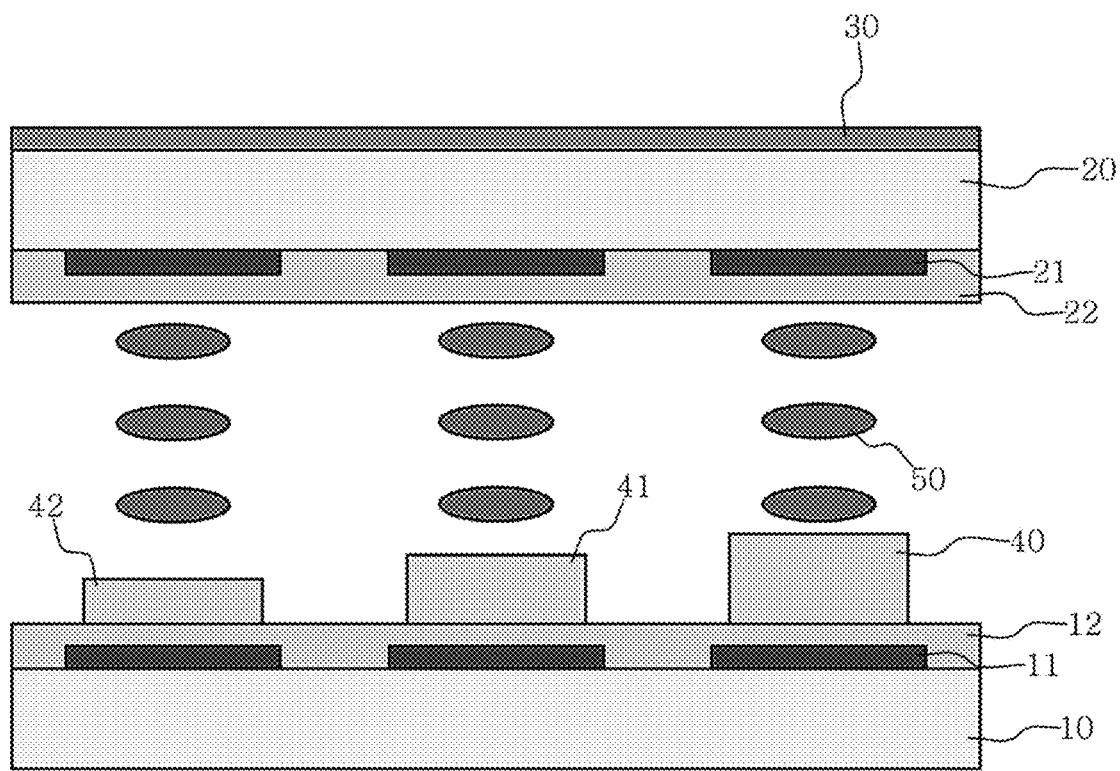

Referring to FIG. 2C, the electrode 21 and the alignment layer 22 may be formed on the inner surface of the upper substrate 20 by the same method as the lower substrate 10, and the alignment layers 12, 22 of the lower substrate 10 and the upper substrate 20 may be each rubbed in anti-parallel directions. A horizontally aligned liquid crystal layer with positive dielectric anisotropy may be positioned between the two substrates.

The polarization plate 30 may be attached to the outer surface (i.e., the side of the incidence of light) of the upper substrate 20. As described above, the polarization direction of the polarization plate 30 may be at 45° with respect to the orientation direction of the liquid crystal.

Although the sequence of the processes has been described above, it is not limited thereto. In another embodiment, a method for manufacturing a reflective-type color display may comprise assembling the upper and lower substrates to face each other with a certain cell gap, and forming a tunable wave plate in the cell gap between the upper and lower substrates, without placing the alignment layer on the tunable wave plate.

In the process of manufacturing a reflective-type color display according to an embodiment as described above, the plurality of helical photonic crystals corresponding to red (R), green (G) and blue (B) unit pixels are all formed in a similar structure. Accordingly, the light-blocking region corresponding to the separation region of the helical photonic crystals may be automatically aligned and formed on the unit pixels, greatly simplifying the process of manufacturing a reflective-type color display.

Figure 3A:
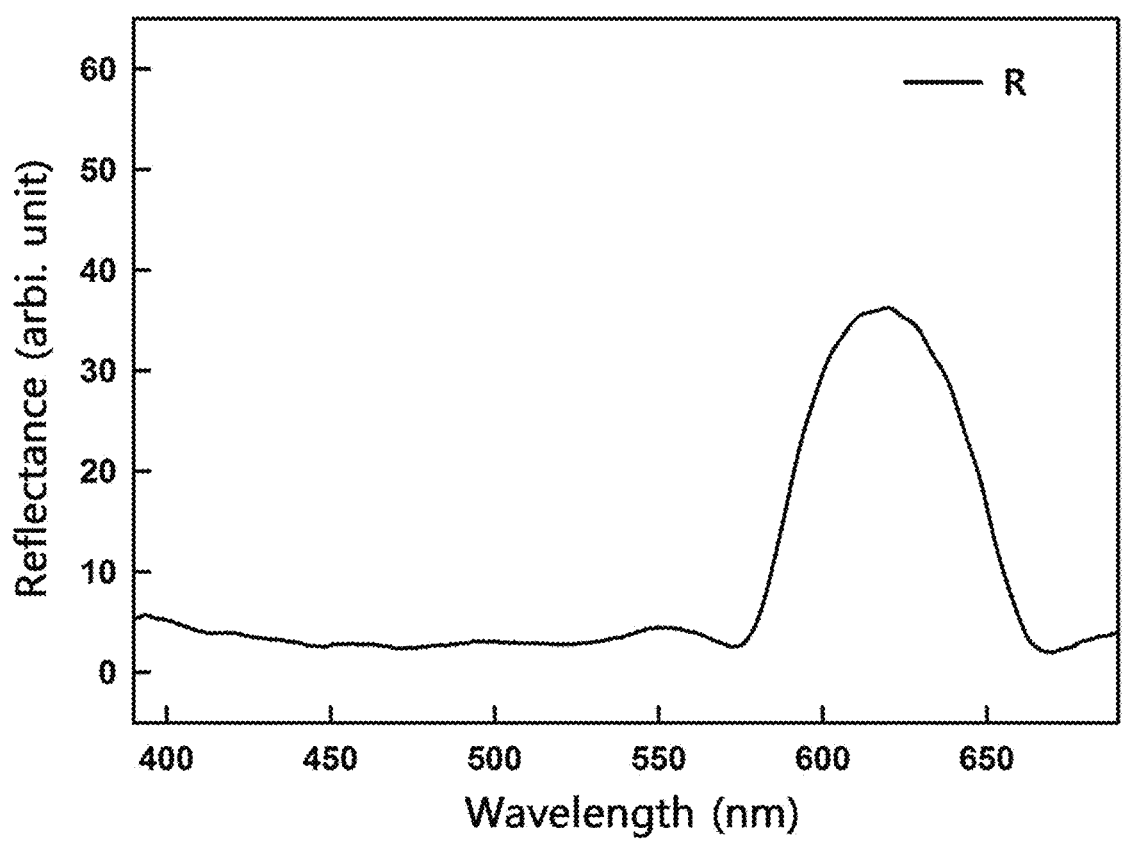
FIGS. 3A to 3C are the reflectance curves as a function of the wavelength for helical photonic crystals fabricated to reflect wavelength ranges corresponding to red (R), green (G) and blue (B) according to embodiments.
Figure 3B:
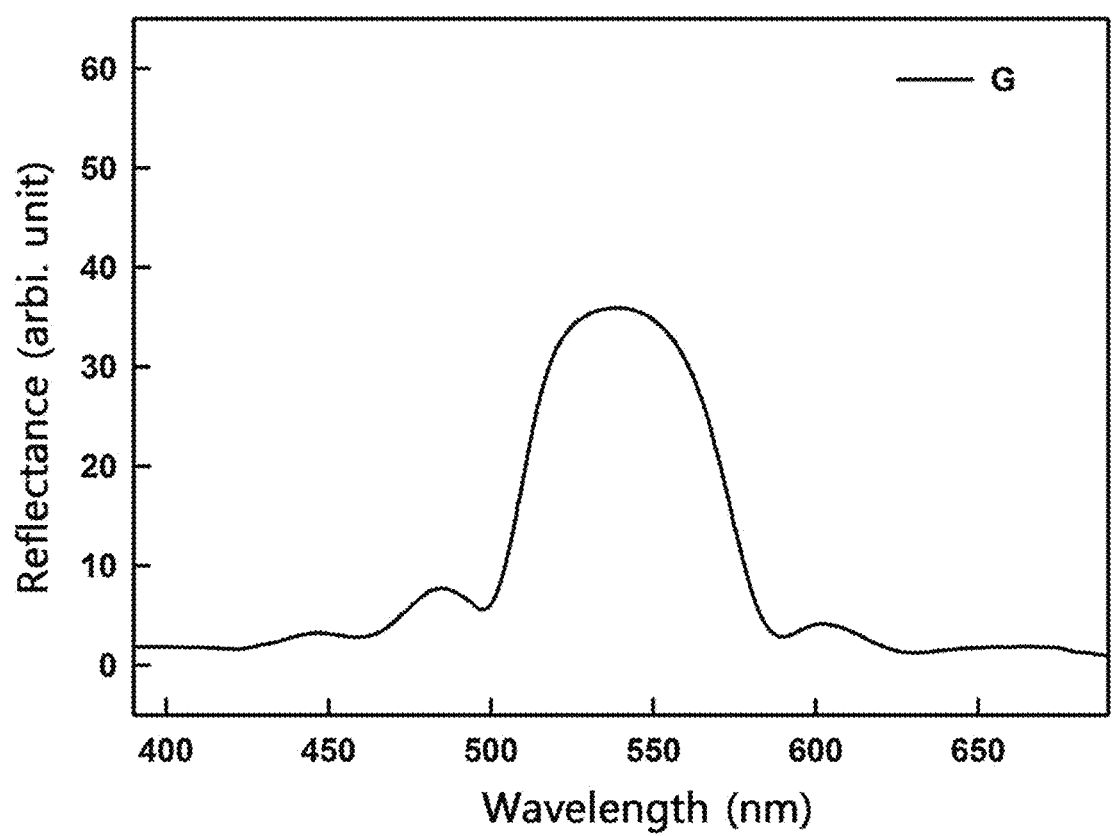
Figure 3C:
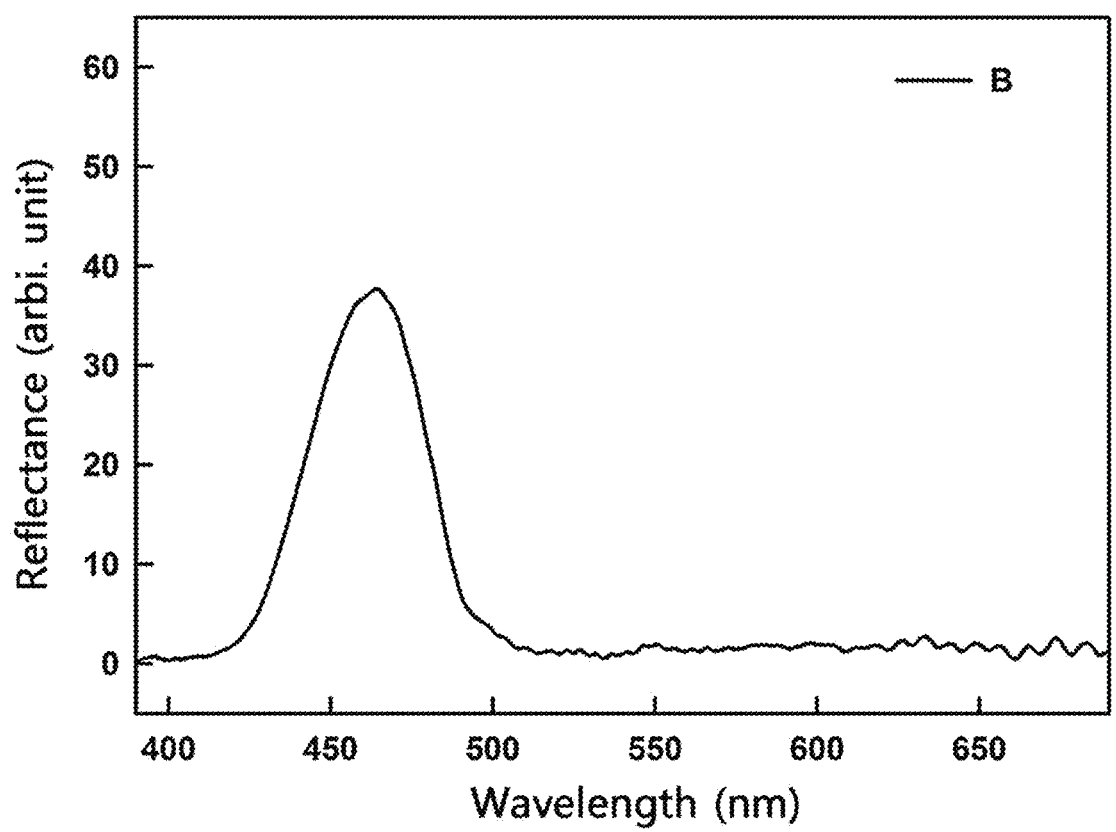

FIGS. 3A to 3C show the reflectance curves as a function of the wavelength for the plurality of helical photonic crystals (40 to 42 in FIG. 1) fabricated to reflect red (R), green (G) and blue (B) wavelength ranges, respectively. In an embodiment, after the alignment layers (12, 22 in FIG. 1) are formed on the glass substrates (10, 20 in FIG. 1) through a solution process, the initial molecular alignment direction of the helical photonic crystals is defined through rubbing. The helical photonic crystals are about 2 μm thick, and formed using chiral reactive mesogen having different values of the helical pitch. The reflectance as a function of the wavelength for the plurality of helical photonic crystals is measured using a commercial UV-Vis. fiber optic spectrometer (Ocean Optics S2000) in ambient environment.

Referring to FIGS. 3A to 3C, the helical photonic crystals with different values of the helical pitch have different reflective wavelength ranges whose center wavelengths are about 620 nm (FIG. 3A), 540 nm (FIG. 3B), and 460 nm (FIG. 3C), respectively, that belong to typical red, green and blue wavelength ranges. It can be seen from FIGS. 3A to 3C that the plurality of helical photonic crystals reflect light in a specific wavelength range. However, the helical pitch of the helical photonic crystal is not limited to the foregoing statements, and the reflective wavelength range of the helical photonic crystal may be properly adjusted using the effective refractive index and/or the helical pitch of the helical photonic crystal.

Figure 4A:
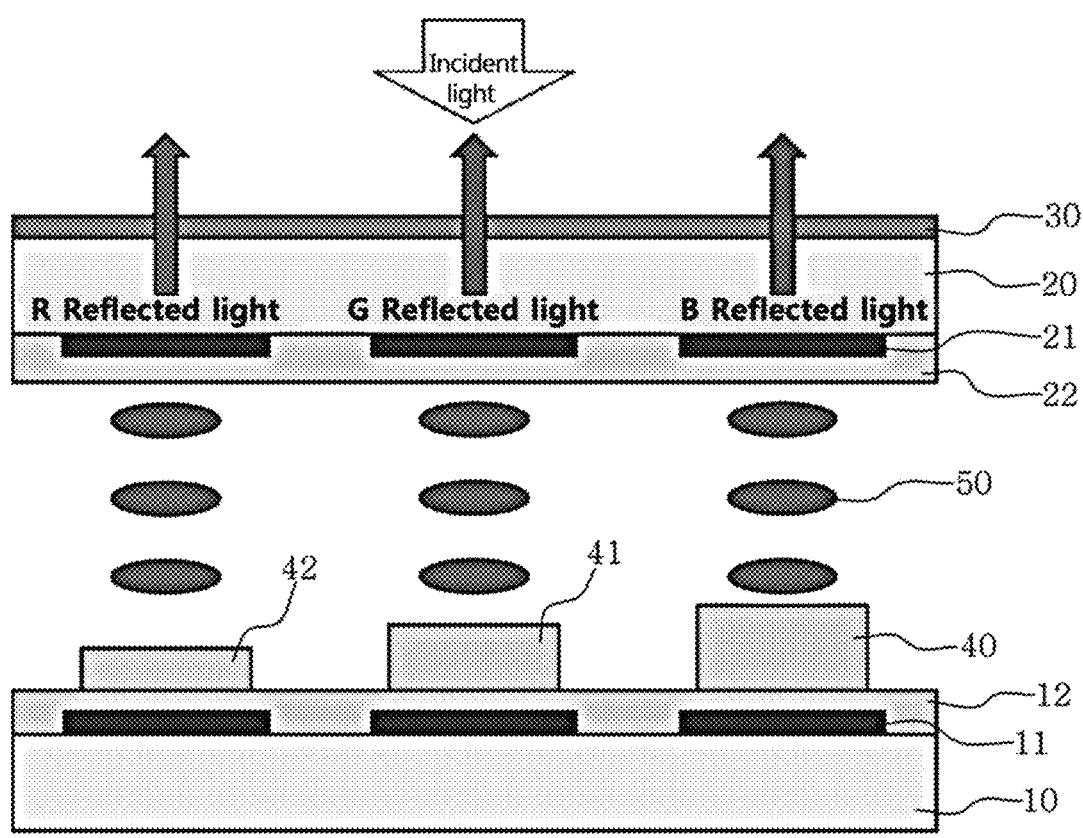
FIGS. 4A and 4B are conceptual views showing the operation of a reflective-type color display according to an embodiment.
Figure 4B:
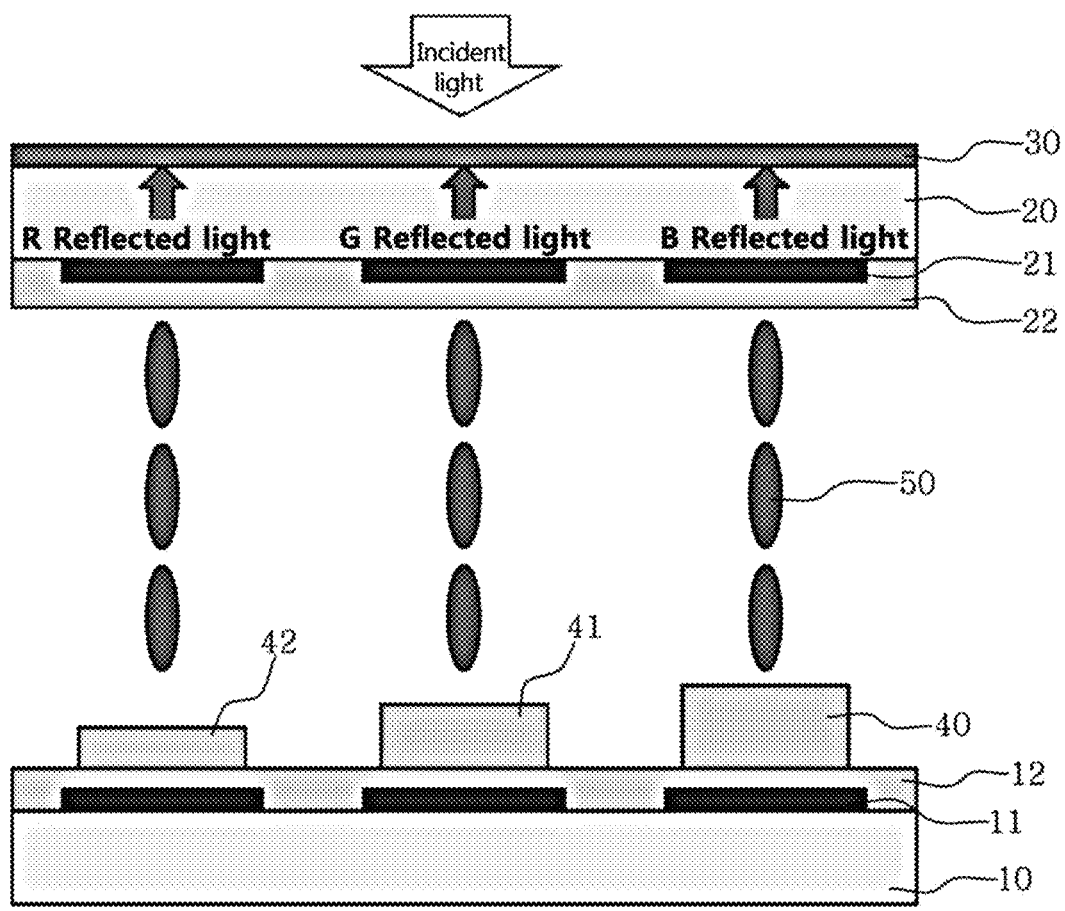

FIGS. 4A and 4B are conceptual views showing the operation of the reflective-type color display according to an embodiment.

Referring to FIG. 4A, when no voltage is applied to the reflective-type color display, the incident light is reflected outward. Specifically, the light incident on the reflective-type color display is linearly polarized after passing through the polarization plate and undergoes the phase retardation while passing through the liquid crystal layer. In this instance, each helical photonic crystal has a proper thickness such that the liquid crystal layer has the phase retardation as much as three quarters of the wavelength with respect to the center wavelength for reflection.

When the voltage is not applied to the reflective-type color display, the horizontally aligned liquid crystal layer acts as a wave plate of three quarters on the light incidence normal to the substrate, and thus the polarization state of the incident light is a circular polarization state. This circular polarization state is the same sense of the handedness of the helical photonic crystal, yielding the total reflection of light in a specific wavelength range, the polarization state of the reflected light is linearly polarized parallel to the polarization direction of the polarization plate positioned in the front of the display while passing through the liquid crystal layer, and each wavelength of R, G, or B is reflected from the corresponding photonic crystal.

In contrast, referring to FIG. 4B, when the voltage equal to or higher than the threshold voltage for the liquid crystal is applied to each unit pixel of the reflective-type color display, no light comes out of the display from reflection. Specifically, when the liquid crystal layer acts as a quarter wave plate upon the application of the voltage to the electrode, the polarization state of the incident light is a circular polarization state with the opposite sense of the handedness to the helical photonic crystal, and no reflection occurs. However, the above-described normally white (NW) mode of the reflective-type color display is for illustration only, and a method for controlling the brightness upon the application of the voltage is not limited thereto. For example, an angle between the polarization direction of the polarization plate and the liquid crystal orientation direction is 135°, the reflective-type color display may be in the normally black (NB) mode in the absence of the applied voltage, no light comes out of the display, and in the presence of the applied voltage, each wavelength of R, G, or B is reflected from the corresponding photonic crystal.

By this principle, it is possible to adjust whether to reflect the visible light upon the application of the voltage and to adjust the reflectance depending on the magnitude of the voltage as described below. Accordingly, it is possible to achieve the analog grey levels of R, G, and G using a temporal division method and high resolution dynamic color images.

Figure 5A:
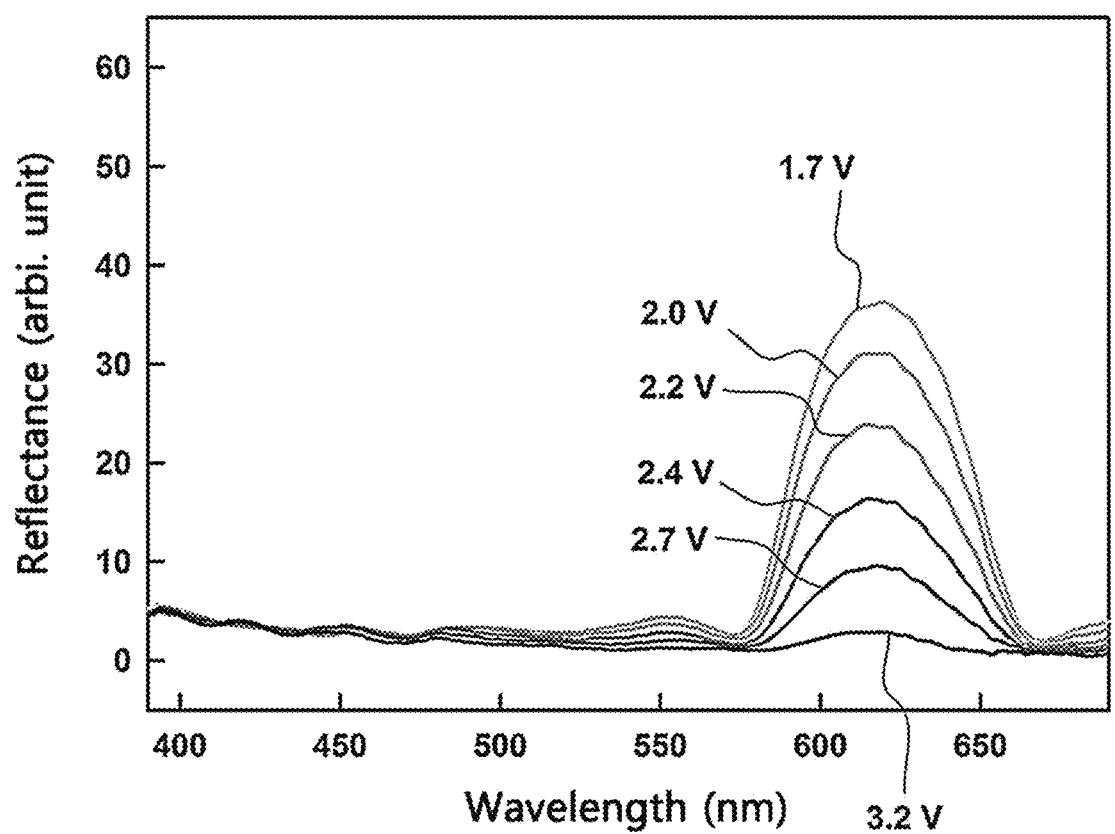
FIGS. 5A to 5C are the reflectance curves as a function of the wavelength at different values of the voltage for red (R), green (G) and blue (B) unit pixels of a reflective-type color display according to an embodiment.
Figure 5B:
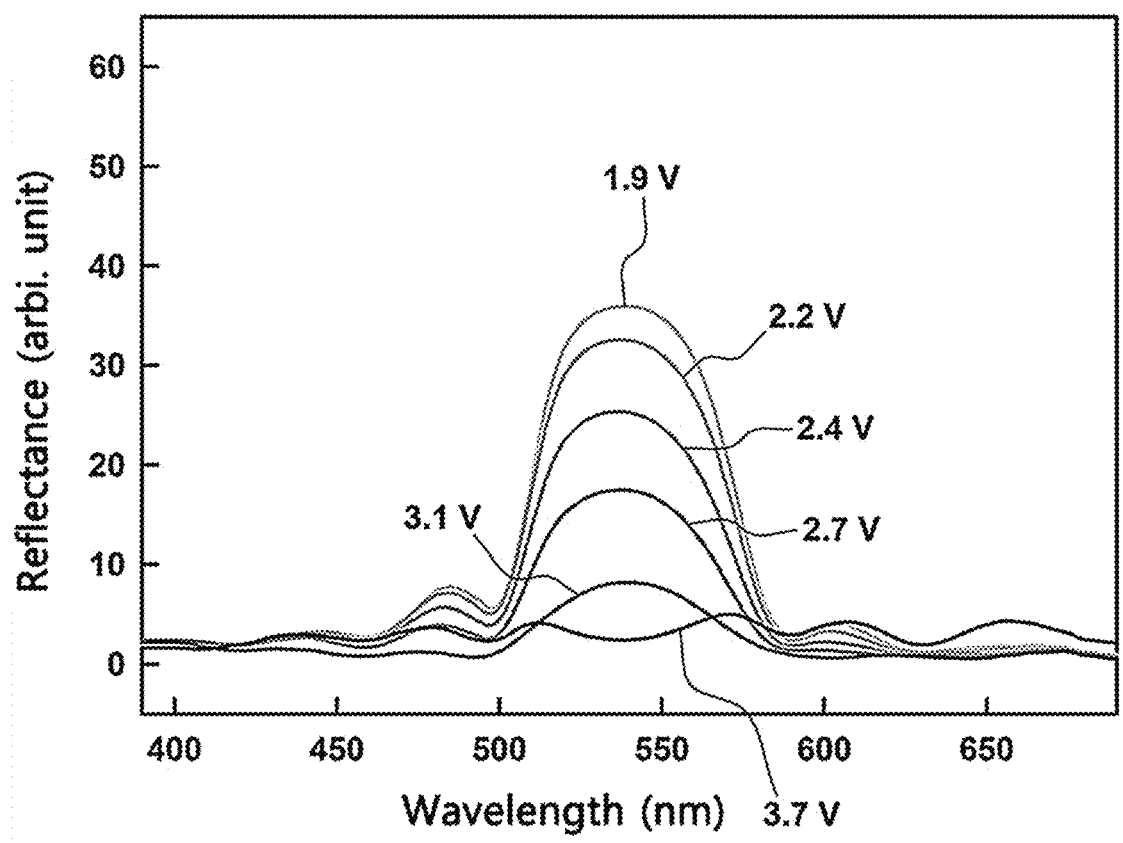
Figure 5C:
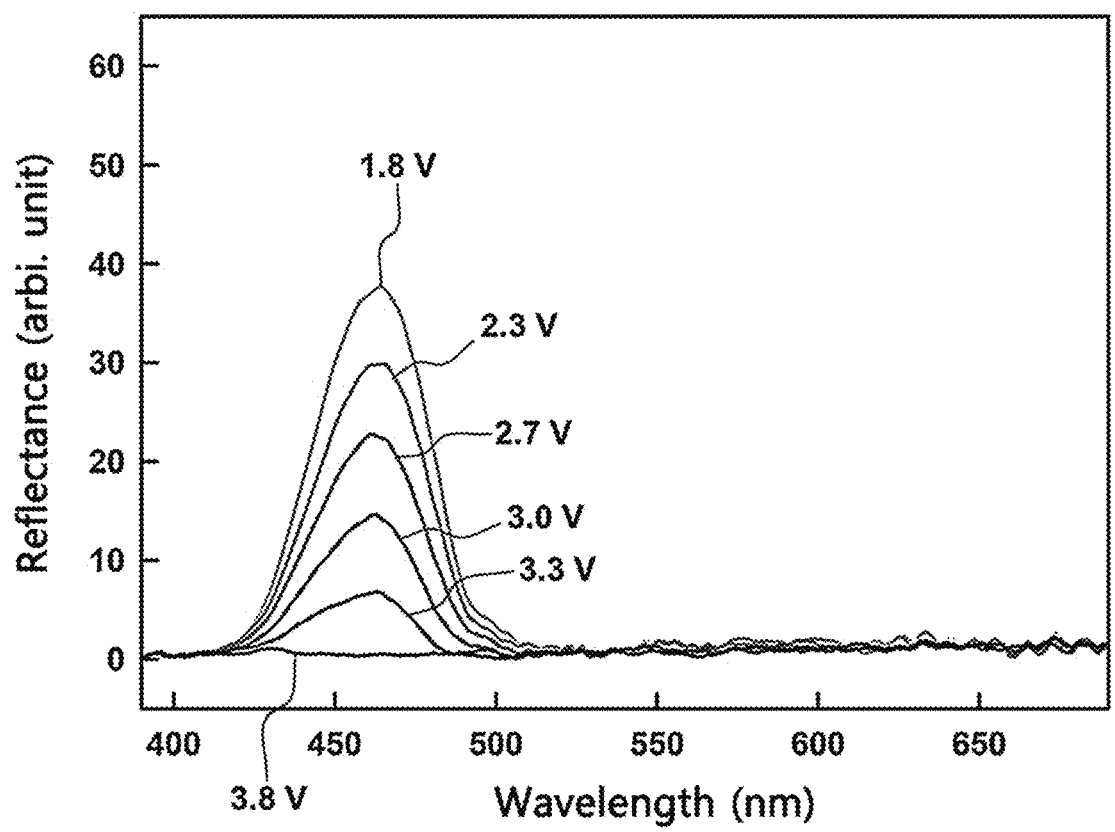

FIGS. 5A to 5C are the reflectance curves as a function of the wavelength at different values of the voltage for R, G and B unit pixels of a reflective-type color display according to the embodiments shown in FIG. 4A. In the same way as the reflectance measurement conditions of FIGS. 3A to 3C, the helical photonic crystal is about 2 μm thick, and is formed using chiral reactive mesogen having different values of the helical pitch. Additionally, the reflectance as a function of the wavelength for the plurality of helical photonic crystals is measured using a commercial UV-Vis. fiber optic spectrometer (Ocean Optics S2000) in ambient environment.

FIG. 5A is the reflectance as a function of the wavelength for R unit pixel. The bright state is obtained when the incident light is reflected upon the application of the voltage equal to or less than the threshold voltage, and the reflectance reduces with increasing the applied voltage while maintaining the wavelength range for reflection. FIGS. 5B and 5C show the reflectance curves as a function of the wavelength for G and B unit pixels, respectively, similar to FIG. 5A, and the reflectance reduces with increasing the applied voltage while maintaining the corresponding wavelength ranges, similar to the reflectance curve for R unit pixel.

FIGS. 6A to 6D are the photographs showing three characters in real operation of a reflective-type color display according to the embodiments. A cell gap between the upper substrate and the lower substrate of the reflective-type color display is about 5 μm, and the liquid crystal of ZLI-1800-100 having relatively small positive dielectric anisotropy is used as a material for a tunable wave plate. The helical photonic crystals included in R, G, and G unit pixels are 1.3 μm, 1.6 μm and 1.9 μm thick, respectively.

Figure 6A:
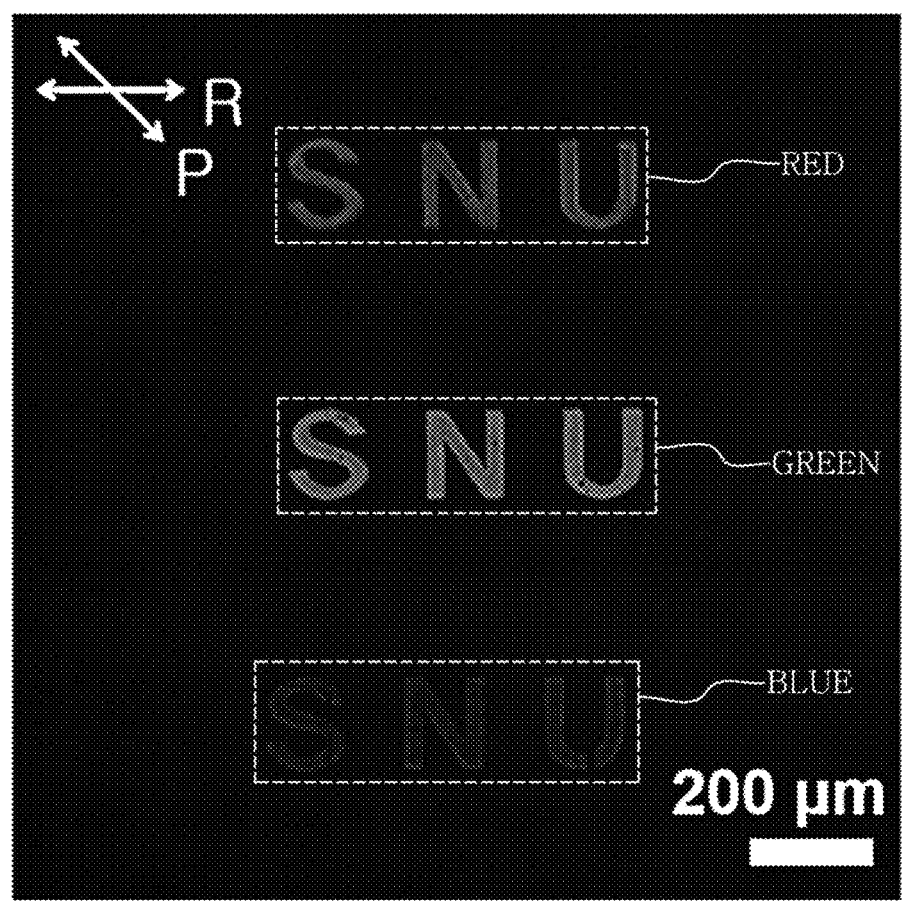
FIGS. 6A to 6D are the photographs showing three characters in real operation of a reflective-type color display according to an embodiment.
Figure 6B:
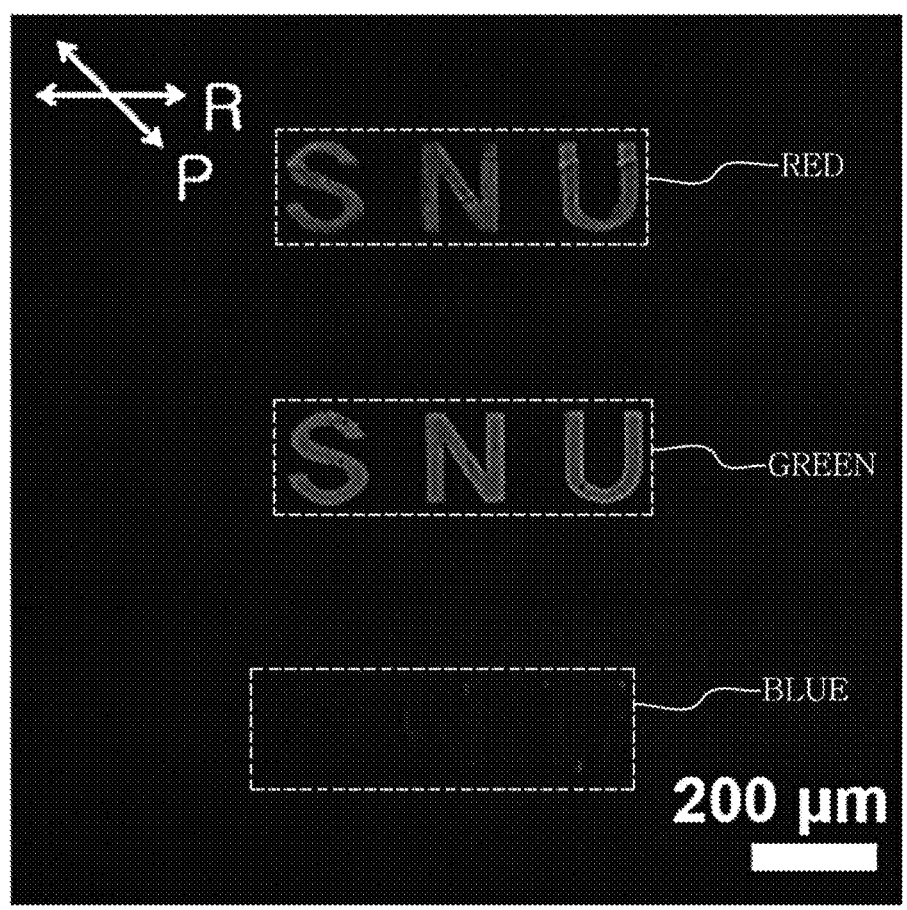
Figure 6C:
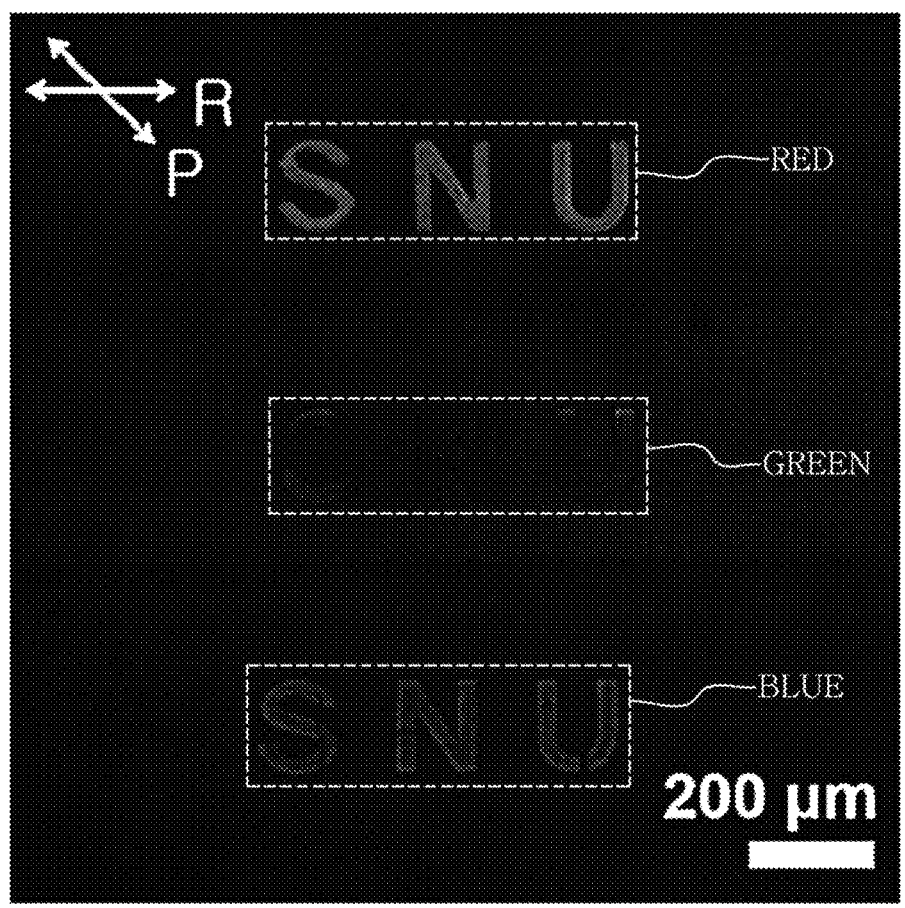
Figure 6D:
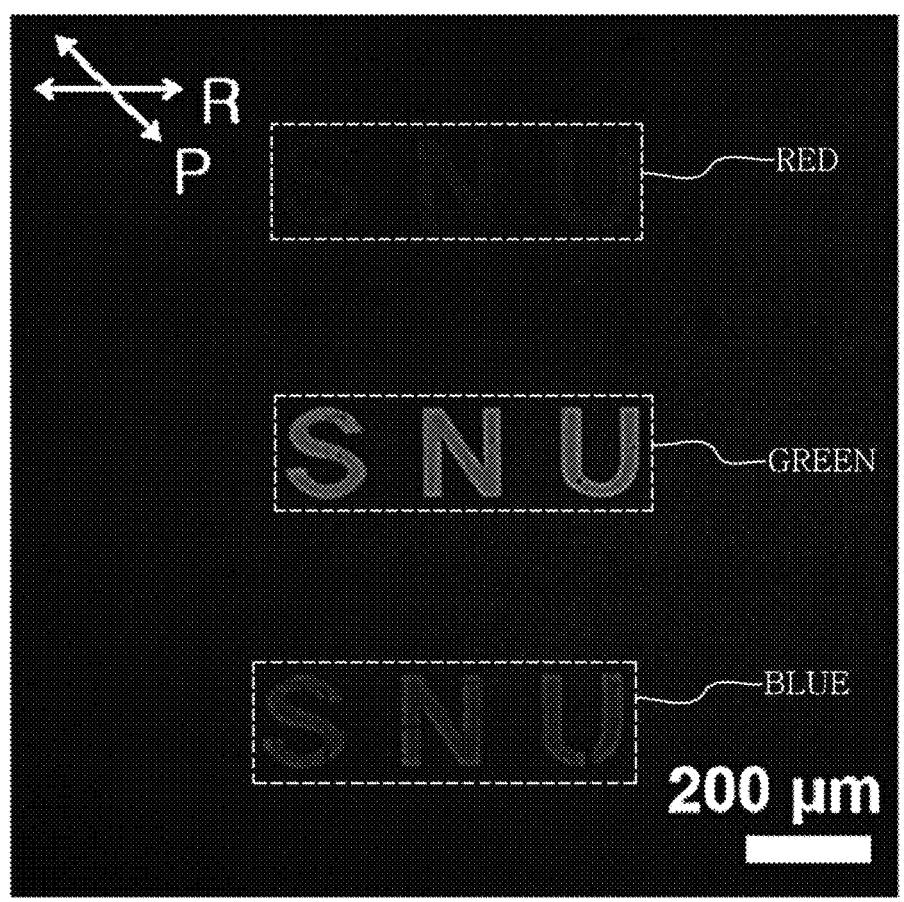

The voltages applied to R, G, and B unit pixels are referred to as $V_R$, $V_G$, and $V_B$, respectively. FIG. 6A is a photographic image showing the case in which no voltage is applied to R, G, and B unit pixels (i.e., $V_R=0$ V, $V_G=0$ V, $V_B=0$ V), and shows that the incident light is reflected from each of R, G, and B unit pixels. On the other hand, FIG. 6B is a photographic image showing the case in which the voltage equal to or higher than the threshold voltage is applied only to B unit pixel (i.e., $V_R=0$ V, $V_G=0$ V, $V_B=3.8$ V), and shows only B unit pixel is in the dark state in which no light is reflected from the photonic crystal corresponding to of B. FIG. 6C shows the case in which the voltage equal to or higher than the threshold voltage is applied only to G unit pixel (i.e., $V_R=0$ V, $V_G=3.7$ V, $V_B=0$ V), and FIG. 6D shows the case in which the voltage equal to or higher than the threshold voltage is applied only to R unit pixel (i.e., $V_R=3.2$ V, $V_G=0$ V, $V_B=0$ V). It can be seen from FIGS. 6A to 6D that each of R, G, B unit pixels can work independently.

Referring to FIGS. 6A to 6D, it can be seen that reflected light is not observed in the light-blocking region corresponding to the separation between R, G, and B unit pixels irrespective of the voltage. Accordingly, as described above, the light-blocking region indeed acts as a black matrix aligned automatically without any additional process.

According to the embodiments described hereinabove, there is provided a reflective-type color display with high color uniformity and high reflectance through the separation of the function of color reflection from the intensity tuning capability of the photonic crystal, and the limitation of applicable materials is relaxed and potentially outstanding reliability and stability is provided. However, the configuration of the reflective-type color display as described above is for illustration only, and the integrated structure of the helical photonic crystal, the tunable wave plate and the polarization plate capable of controlling the intensity of structural colors is not limited to the material used in the embodiments, and may include any other material capable of controlling the polarization of light.

While the present disclosure has been hereinabove described with reference to the embodiments shown in the drawings, this is provided for illustration only and those skilled in the art will understand that various modifications and variations may be made to the embodiments. However, it should be noted that such modifications fall in the technical protection scope of the present disclosure. Therefore, the true technical protection scope of the present disclosure should be defined by the technical spirit of the appended claims.

What is claimed is:

1. A reflective color display, comprising:
   a lower substrate and an upper substrate;
   a polarization plate positioned on an outer surface of the upper substrate;
   a first unit pixel associated with a first color, the first unit pixel including a first helical photonic crystal arranged between the lower substrate and the upper substrate, the first helical photonic crystal having a first total thickness measured in a direction away from a surface of the lower substrate and having a first reflection property of light in a first visible range that is associated with the first color;

a second unit pixel associated with a second color, the second unit pixel including a second helical photonic crystal arranged between the lower substrate and the upper substrate, the second helical photonic crystal having a second total thickness measured in the direction away from the surface of the lower substrate and having a second reflection property of light in a second visible range that is associated with the second color;

a third unit pixel associated with a third color, the third unit pixel including a third helical photonic crystal arranged between the lower substrate and the upper substrate, the third helical photonic crystal having a third total thickness measured in the direction away from the surface of the lower substrate and having a third reflection property of light in a third visible range that is associated with the third color; and a tunable waveplate positioned on the first helical photonic crystal, the second helical photonic crystal, and the third helical photonic crystal to control a reflection intensity by continuously changing a phase retardation;

wherein the first helical photonic crystal, the second helical photonic crystal, and the third helical photonic crystal are non-overlapping with each other, and wherein the first total thickness of the first helical photonic crystal, the second total thickness of the second helical photonic crystal, and the third total thickness of the third helical photonic crystal are different.

2. The reflective color display according to claim 1, wherein each of the first helical photonic crystal, the second helical photonic crystal, and the third helical photonic crystal is configured to reflect incident light in a certain wavelength range that corresponds to a helical pitch of the corresponding one of the first helical photonic crystal, the second helical photonic crystal, or the third helical photonic crystal, and a polarization component of the incident light is in a same sense of handedness as the corresponding one of the first helical photonic crystal, the second helical photonic crystal, or the third helical photonic crystal.

3. The reflective color display according to claim 2, wherein the reflective color display has complete reflection of the incident light.

4. The reflective color display according to claim 1, wherein each of the first helical photonic crystal, the second helical photonic crystal, and the third helical photonic crystal has a cross section of a closed figure shape formed by a polygon or a curve and a straight line when viewed from a direction perpendicular to the surface of the lower substrate.

5. The reflective color display according to claim 1, further comprising:
a light-blocking region where the first helical photonic crystal, the second helical photonic crystal, and the third helical photonic crystal are not arranged.

6. The reflective color display according to claim 1, wherein a molecular alignment in he each of the first helical photonic crystal, the second helical photonic crystal, and the third helical photonic crystal has a helical shape around an axis that is in a direction perpendicular to the surface of the lower substrate.

7. The reflective color display according to claim 1, further comprising:
a first patterned electrode layer on the surface of the lower substrate, and a second patterned electrode layer on an inner surface of the upper substrate, wherein the inner surface of the upper substrate faces the surface of the lower substrate;

wherein the first patterned electrode layer and the second patterned electrode layer are used for electrically controlling the phase retardation of the tunable wave plate.

8. The reflective color display according to claim 7, further comprising:
a first alignment layer formed on the first patterned electrode layer, and a second alignment layer formed on the second patterned electrode layer;

wherein the first alignment layer defines an initial molecular alignment direction of the first helical photonic crystal, the second helical photonic crystal, and the third helical photonic crystal.

9. The reflective color display according to claim 7, wherein the phase retardation is three quarters of a wavelength of light reflected by the first helical photonic crystal, the second helical photonic crystal, and the third helical photonic crystal when a voltage is not applied to one of the first patterned electrode layer or the second patterned electrode layer, and the phase retardation is one quarter of the wavelength of the light reflected by the first helical photonic crystal, the second helical photonic crystal, and the third helical photonic crystal when a voltage that is equal to or greater than a threshold voltage of the tunable waveplate is applied to one of the first patterned electrode layer or the second patterned electrode layer.

10. The reflective color display according to claim 1, wherein the reflective color display is a reflective liquid crystal display including the tunable wave plate composed of a liquid crystal.

11. The reflective color display according to claim 1, wherein the first helical photonic crystal, the second helical photonic crystal, and the third helical photonic crystal are made of a same material.

12. The reflective color display according to claim 1, wherein the polarization plate is in direct contact with the outer surface of the upper substrate.

13. A method for manufacturing a reflective color display, comprising:
patterning a first electrode layer on a surface of a lower substrate and a second electrode layer on a surface of an upper substrate that faces the surface of the lower substrate;

forming a first alignment layer on the first patterned electrode layer and a second alignment layer on the second patterned electrode layer;

forming a plurality of unit pixels including:
a first unit pixel associated with a first color, the first unit pixel including a first helical photonic crystal arranged between the lower substrate and the upper substrate, the first helical photonic crystal having a first total thickness measured in a direction away from a surface of the lower substrate and having a first reflection property of light in a first visible range that is associated with the first color;

a second unit pixel associated with a second color, the second unit pixel including a second helical photonic crystal arranged between the lower substrate and the upper substrate, the second helical photonic crystal having a second total thickness measured in the direction away from the surface of the lower substrate and having a second reflection property of light in a second visible range that is associated with the second color; and a third unit pixel associated with a third color, the third unit pixel including a third helical photonic crystal arranged between the lower substrate and the upper substrate, the third helical photonic crystal having a third total thickness measured in the direction away from the surface of the lower substrate and having a third reflection property of light in a third visible range that is associated with the third color;

assembling the upper substrate and the lower substrate to face each other in a certain cell gap;

forming a tunable wave plate in the cell gap between the upper substrate and the lower substrate, on the first helical photonic crystal, the second helical photonic crystal, and the third helical photonic crystal; and placing a polarization plate on an outer surface of the upper substrate, wherein the first helical photonic crystal, the second helical photonic crystal, and the third helical photonic crystal are formed so as to be non-overlapping with each other, and wherein the first total thickness of the first helical photonic crystal, the second total thickness of the second helical photonic crystal, and the third total thickness of the third helical photonic crystal are different.

14. The method for manufacturing the reflective color display according to claim 13, wherein each of the first helical photonic crystal, the second helical photonic crystal, and the third helical photonic crystal is configured to reflect incident light in a certain wavelength range that is determined by a helical pitch of the corresponding one of the first helical photonic crystal, the second helical photonic crystal, or the third helical photonic crystal, and a polarization component of the incident light is in a same sense of handedness as the corresponding one of the first helical photonic crystal, the second helical photonic crystal, or the third helical photonic crystal.

15. The method for manufacturing the reflective color display according to claim 13, wherein each of the plurality of helical photonic crystals have first helical photonic crystal, the second helical photonic crystal, and the third helical photonic crystal has a cross section of a closed figure shape formed by a polygon or a curve and a straight line when viewed along a direction perpendicular to the surface of the lower substrate.

16. The method for manufacturing the reflective color display according to claim 13, wherein a molecular alignment in the-each of the first helical photonic crystal, the second helical photonic crystal, and the third helical photonic crystal has a helical shape around an axis that is in a direction perpendicular to the surface of the lower substrate.

17. The method for manufacturing the reflective color display according to claim 13, wherein the first patterned electrode layer and the second patterned electrode layer are used for electrically controlling a phase retardation of the tunable wave plate.

18. The method for manufacturing the reflective color display according to claim 13, wherein the first alignment layer defines an initial molecular alignment direction of the first helical photonic crystal, the second helical photonic crystal, and the third helical photonic crystal.

* * * * *